(12) United States Patent
Wu et al.

(10) Patent No.: US 7,428,742 B2
(45) Date of Patent: Sep. 23, 2008

(54) MASS STORAGE CRADLE DEVICE

(76) Inventors: Victor Chuan-Chen Wu, 21055 Lauretta Dr., Cupertino, CA (US) 95014; Bill Kwong, 20363 Leutar Ct., Saratoga, CA (US) 95070

( * ) Notice: Subject to any disclaimer, the term of this patent is extended or adjusted under 35 U.S.C. 154(b) by 327 days.

(21) Appl. No.: 10/936,492

(22) Filed: Sep. 9, 2004

(65) Prior Publication Data
US 2006/0050477 A1    Mar. 9, 2006

(51) Int. Cl.
*G11B 17/03* (2006.01)
(52) U.S. Cl. .................................... 720/654
(58) Field of Classification Search ............... 720/654
See application file for complete search history.

(56) References Cited

U.S. PATENT DOCUMENTS

| | | | | |
|---|---|---|---|---|
| 4,941,841 A | * | 7/1990 | Darden et al. | 361/685 |
| 5,233,594 A | * | 8/1993 | Wilhelm | 361/685 |
| RE35,915 E | * | 10/1998 | Hastings et al. | 439/377 |
| 6,515,817 B1 | * | 2/2003 | Hamaguchi et al. | 360/73.03 |
| 6,781,826 B1 | * | 8/2004 | Goldstone et al. | 361/685 |
| 6,840,801 B1 | * | 1/2005 | Behl | 439/541.5 |
| 6,888,727 B2 | * | 5/2005 | Chang | 361/752 |
| 7,158,327 B2 | * | 1/2007 | Suzuki et al. | 360/69 |
| 7,268,964 B2 | * | 9/2007 | Suzuki et al. | 360/69 |
| 2004/0036995 A1 | * | 2/2004 | Suzuki et al. | 360/69 |
| 2005/0057849 A1 | * | 3/2005 | Twogood et al. | 360/97.02 |

* cited by examiner

*Primary Examiner*—David D Davis
(74) *Attorney, Agent, or Firm*—Troxell Law Office, PLLC

(57) ABSTRACT

A mass storage cradle device that enables different types of storage devices to be conveniently added or removed from a computer or equipment without disassembling and reassembling the computer or equipment which comprising: a cradle portion that can be secured to a drive bay of the computer or equipment, which comprises openings; an enclosure portion that can slide in and out of the cradle portion for containing the storage devices and providing connection of the electrical signals of the storage devices; and a bridge portion that can be positioned inside the enclosure portion and comprises a first interface as well as a second interface, wherein, the first interface is different to the second interface, either in signals type or physical connecting type.

12 Claims, 5 Drawing Sheets

MASS STORAGE CRADLE DEVICE

BACKGROUND OF THE INVENTION

1. Field of the Invention

The present invention relates to a mass storage cradle device that enables various types of storage devices, such as SATA, IDE, SCSI, USB, Firewire or USIB type storage devices to be easily swapped in and out of a drive bay of any desktop computers, Kiosk or computing equipment.

2. Description of Related Art

A standard desktop computer typically provides one or more compartments (also called drive bays) for the installation of 5¼ inch or 3½ inch storage devices such as CD ROM, DVD ROM or CDRW drive, hard drive, ZIP, SuperDisk etc. Because of space limitation, many desktop computers, Kiosk or computing equipment have only one to two drive bays, thus limiting the number of devices that can be installed. Once a storage device is installed into the drive compartment or drive bay, replacement or upgrade of the storage device requires careful disassembling and reassembling of the computer by a trained technician.

Data storage devices primary fall into two categories: the removable storage and hard disk storage. These two types of data storage devices offer different advantages depending on the type of applications.

In the removable storage, the storage media can be replaced as more storage space is needed. Cost of the media is relatively inexpensive. But the data transfer rate for removable storage devices in general are much slower than hard disk storage. Thus the removable storage is great for data archiving. To access the data stored on a removable storage media, the computer must have a compatible drive that can read the data from the media. Example, a CDRW drive or CD-ROM drive is needed to access the data on a CDRW media, a DVD drive is needed to access data on a DVD media, a 240 MB-ZIP drive is needed to access data on a 240 MB ZIP media. As a result, in order for a computer to access data on a variety of removable media, it must be equipped with various types of drives.

In the case of hard disk storage, the media and the drive are integrated together. With this design, the data transfer rate for hard drive is much faster than the removable storage. Thus hard disk is great for storing program files, for storing data that are accessed all the time and for streaming video application. Since the hard drive and the storage media are all integrated in one unit, the computer can access the data stored in a hard drive by connecting up the hard disk controller cable and the power cable from inside a computer to the hard drive. But this way of connecting a hard drive to a computer usually requires opening up the computer and technical skill.

External hard drive solves the problem of connecting a drive to a computer without opening up the computers. The external hard drives attach to a computer via one of the common I/O ports on a computer USB, Firewire or PCMCIA. Since all the external hard drives are constructed with an enclosure to house the hard drive and the interface electronics. The additional cost of the housing and interface electronics make the external hard drive much more expensive than an internal IDE drive. So when an external hard drive capacity is used up, the user will have to purchase another external hard drive in order to have more data storage capacity. In addition, the external hard drive with this traditional design also limits its use to a single interface. If you have an external USB hard drive, a computer that has no USB port will not be able to use the hard drive.

Most of the storage devices in the markets today come in IDE interface only. At present, the SATA (serial ATA) provides higher speed such as 1.5 Gbps, 3 Gbps even more 6 Gbps (in the future) and less cable size than the IDE Interface. The traditional design of the external hard drive does not support the SATA hard drive; therefore, it cannot enjoy the advantages brought by the SATA hard drive.

Therefore, the solution or invention in this patent deals with storage devices that has either IDE or SATA interface and only be used both in this mass storage cradle device.

SUMMARY OF THE INVENTION

The object of the present invention is to provide a mass storage cradle device that enables various types of storage devices, especially either the SATA type hard drive or IDE hard disk drive type, to be easily swapped in and out of a drive bay of any desktop computers, Kiosk or computing equipment.

This invention provides a design of a mass storage cradle device that enables various types of storage devices to be easily swapped in and out of a drive bay of any desktop computers, Kiosk or computing equipment. Storage devices can be changed on the fly for upgrade, repair or for different applications, without disassembling or reassembling of the equipment enclosure. In addition, the storage device enclosure of the mass storage cradle device also enables any storage device to be used as an external storage device once it is removed from the drive bay. So the mass storage cradle device design adds great flexibility to the connectivity between the storage devices and any computer equipment. Mass storage cradle device design also eliminates the inconvenience and the high cost associated with repairing or upgrading any storage device from any computer equipment.

According to one non-limited embodiment of the present invention, the mass storage cradle device comprises: a cradle portion that can be secured to a drive bay of the computer or equipment on the side by screws, which comprises an opening and a plurality of sector-shaped openings; an enclosure portion that can slide in and out of the cradle portion for containing the storage devices and providing connection of the electrical signals of the storage devices; and a bridge portion that can be positioned inside the enclosureportion and comprises a first interface as well as a second interface, wherein, the first interface is different to the second interface either in signals type or physical connecting type.

BRIEF DESCRIPTION OF THE DRAWINGS

The present invention can be more fully understood by reference of the following description and accompanying drawings, in which.

DETAILED DESCRIPTION OF THE PREFERRED EMBODIMENTS

Figure 1:
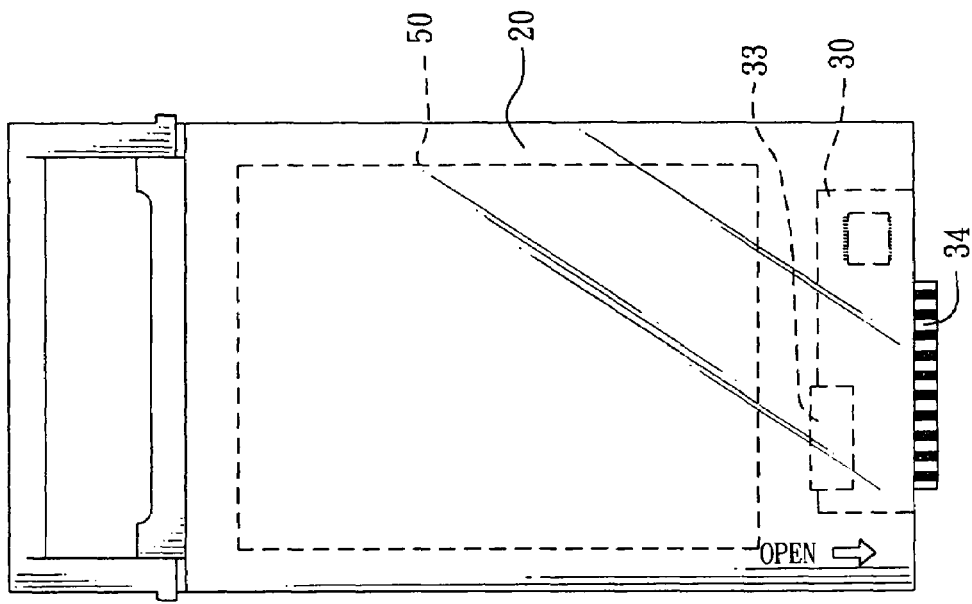
FIG. 1 illustrates a disassembly appearance of the mass storage cradle device in accordance with one embodiment of the present invention.
Figure 1:
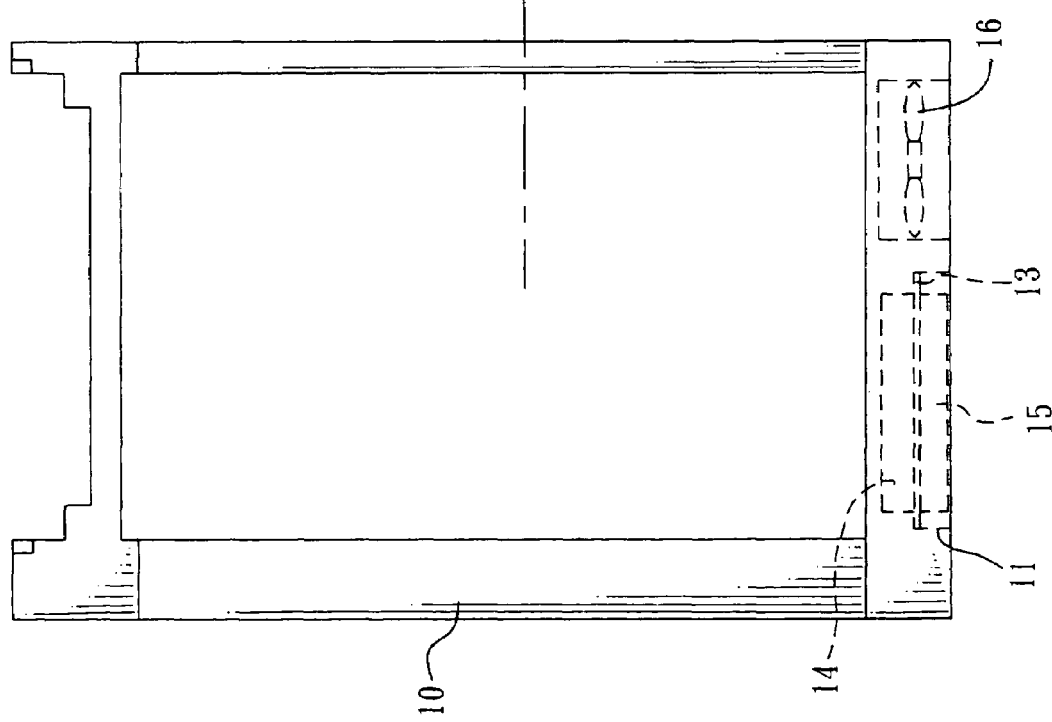

Referring to FIG. 1, which illustrates a disassembly appearance of the mass storage cradle device in accordance with one embodiment of the present invention. The mass storage cradle device of the present invention can enable different types of storage devices, such as SATA, IDE, SCSI, USB, Firewire or USIB type storage devices, to be conveniently added or removed from a computer or equipment without disassembling and reassembling the computer or equipment, which comprising: a cradle portion 10; an enclosure portion 20; and a bridge portion 30.

The cradle portion 10 is designed to have the same Width and height of the drive bay of the computer or the equipment (not shown in the drawing for simplicity) so to create a snug fit when the cradle portion 10 is installed inside a standard 5¼" drive bay (not shown in the drawing for simplicity). Once inside the drive bay, the cradle portion 10 is secured to the drive bay on the side by screws, preferably.

Wherein, the cradle portion 10 further comprises an opening 11 and a plurality of sector-shaped openings 12 (please refer to FIG. 4); the enclosure portion 20 that can be slid in and out of the cradle portion 10 for containing a storage devices 50, such as a hard disk drive and providing connection of the electrical signals of the storage devices 50, wherein, the storage devices 50 is such as SATA, IDE, SCSI, USB, Firewire or USIB type hard disk drive; especially, the SATA type hard disk drive is preferably due to its higher speed and less cable size. Wherein, the cradle portion 10 and the enclosure portion 20 are made of plastic or metal material, such as aluminum, preferably.

The bridge portion 30 that can be positioned inside the enclosure portion 20, and can translate a first interface into a second interface, wherein the first interface is for example but not limited to a SATA, IDE, SCSI, USB, Firewire or USIB interface of the storage devices 50, and the second interface is for example but not limited to a SATA, IDE, SCSI, USB, Firewire or USIB interface of the computer or equipment, particularly, the first interface is different to the second interface either in signals type or physical connecting type. For a non-limited example of the present invention, the bridge portion 30 can translate the signals of the first interface of the storage devices 50, such as SATA, IDE, SCSI, USB, Firewire or USIB interface, into the signals of the second interface of the computer or equipment, such as IDE interface either in signals type or physical connecting type.

Figure 2:
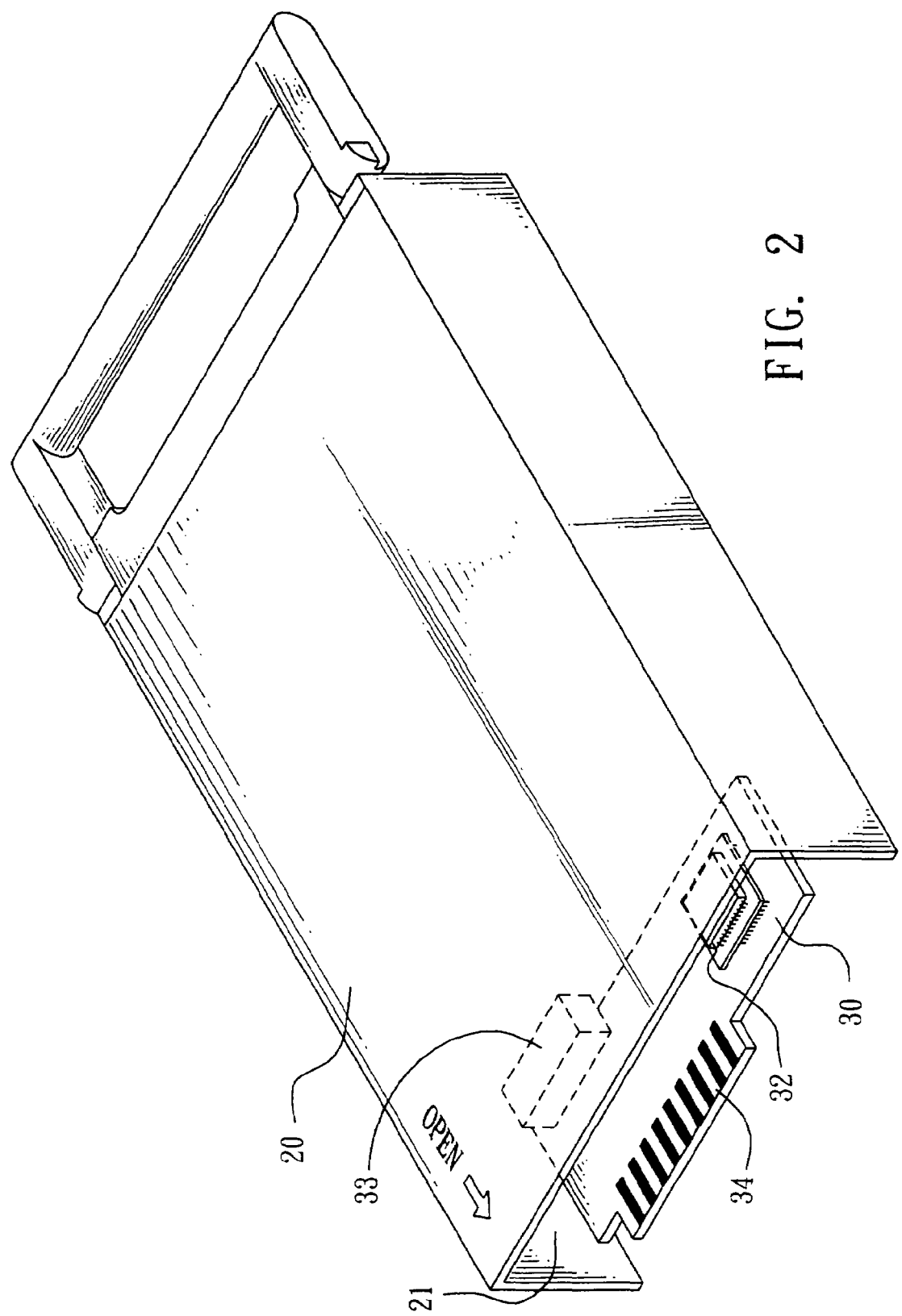
FIG. 2 illustrates the enclosure portion of the Mass storage cradle device in accordance with one embodiment of the present invention.

Referring to FIG. 2, which illustrates the enclosure portion 20 of the mass storage cradle device in accordance with one embodiment of the present invention. The enclosure portion 20 has a hollow space 21 to contain the storage device 50, such as a SATA, IDE, SCSI, USB, Firewire or USIB interface hard disk drive and the bridge portion 30, for the purpose of illustrating, we assume that the storage device 50 is a SATA hard disk drive. The SATA connector 51 (please refer to FIG. 5) of the hard disk drive 50 is directly connected to the SATA connector 33 of the bridge portion 30 for executing SATA interface and IDE interface translating therebetween by the ASIC board 32 (please refer to FIG. 3). While assembling the enclosure portion 20, the hard disk drive 50 is firstly positioned and fastened in the space 21, and then the connector 51 of the hard disk drive 50 is directly connected to the SATA connector 33 of the bridge portion 30.

Figure 3:
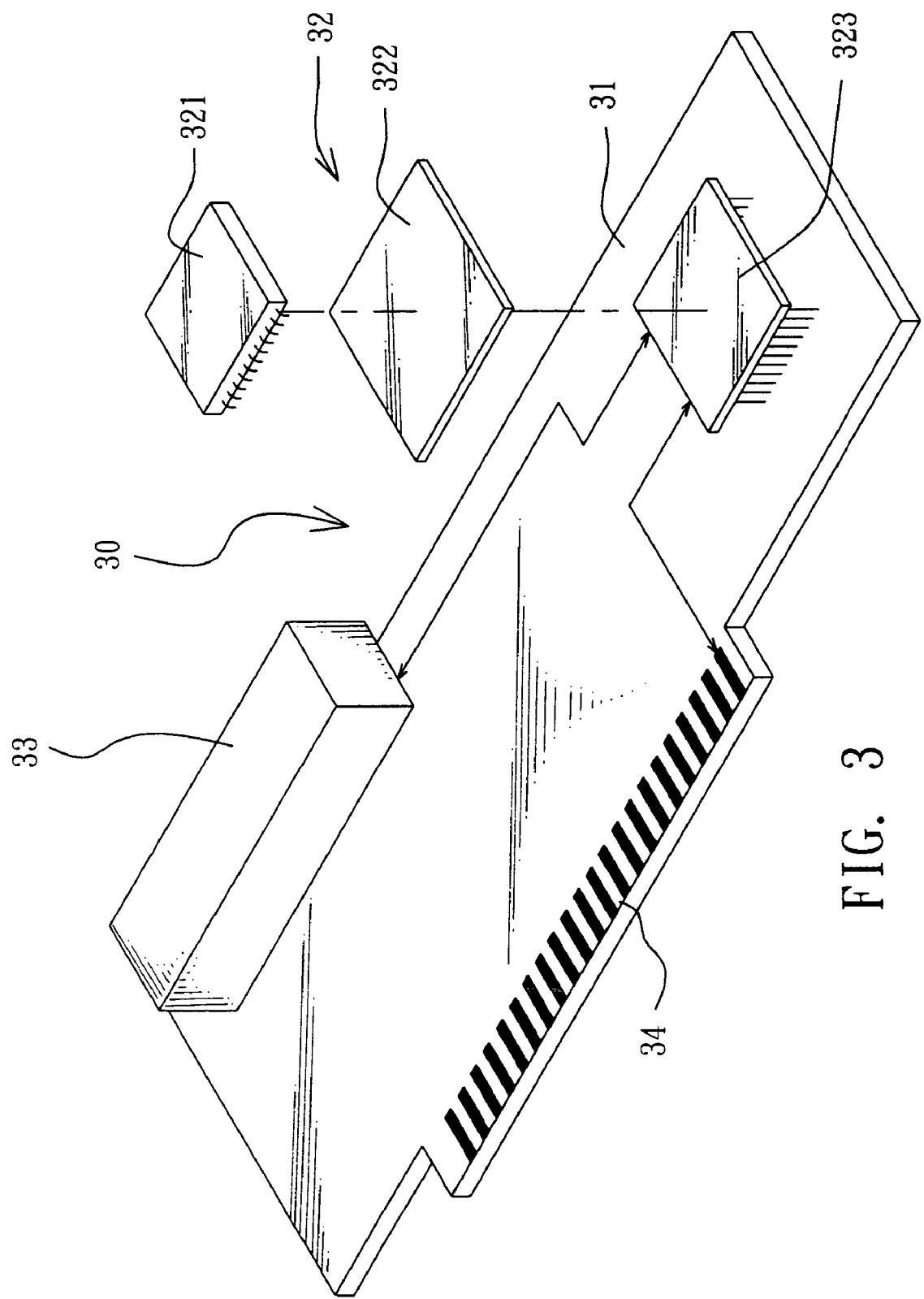
FIG. 3 illustrates the block diagram of the bridge portion in accordance with one embodiment of the present invention.

Referring to FIG. 3, which illustrates the block diagram of the bridge portion 30 in accordance with one embodiment of the present invention. As shown in the Fig., the bridge portion 30 of the present invention further comprises: a PCB 31; an ASIC board 32; a connector 33 and a male gold finger 34.

Figure 4:
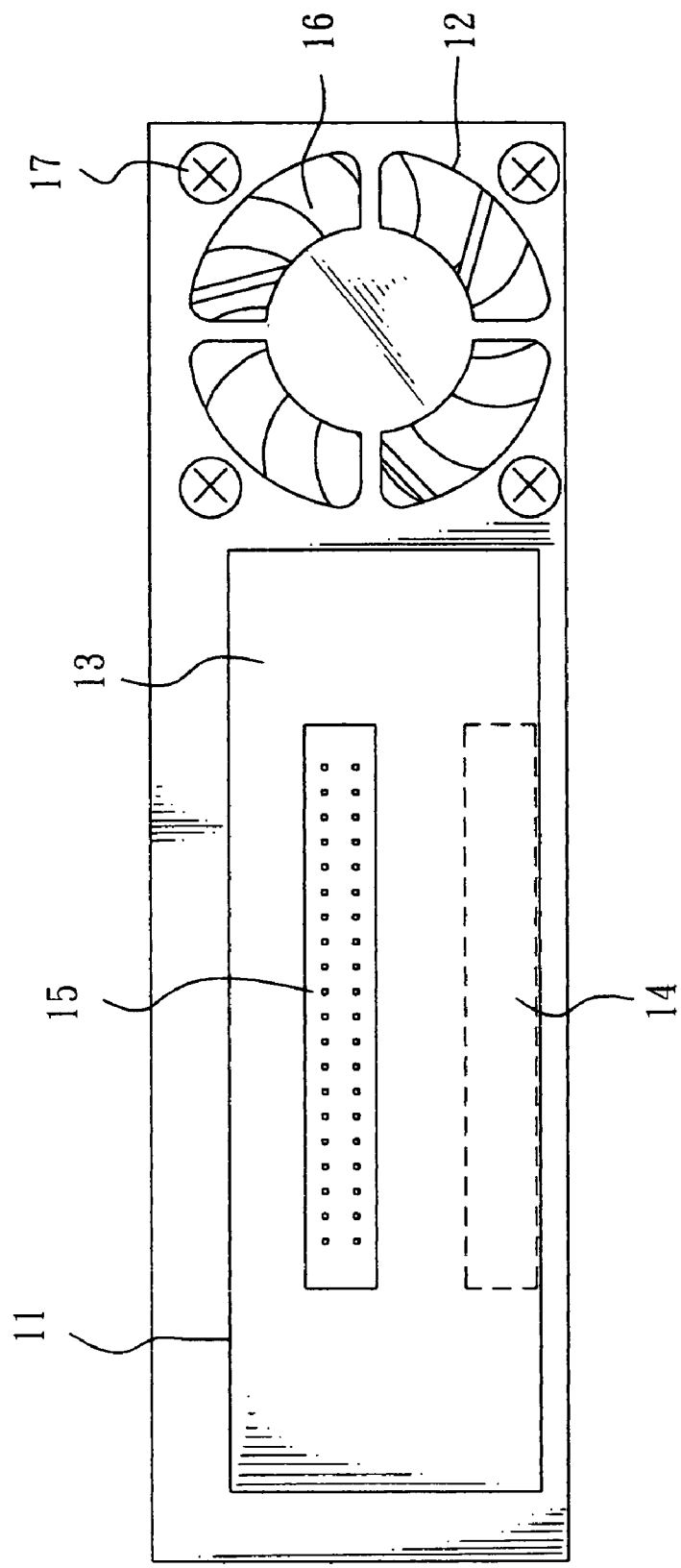
FIG. 4 illustrates the enlarge view of the cradle portion in accordance with one embodiment of the present invention.

The PCB 31 that can be positioned inside the space 21 of the enclosure portion 20 for conveying the ASIC board 32 and connector 33; the ASIC board 32 can be removably mounted on the PCB 31 for translating the first interface (such as SATA) of the hard disk drive 50 into the second interface (such as IDE) for later connecting to an IDE interface on the motherboard of a computer or the control board of a equipment (not shown), the connector 33, such as a SATA, IDE, SCSI, USB, Firewire or USIB, for the purpose of illustrating, we assume that the connector 33 is a SATA connector that can be mounted on the PCB 31 and coupled to the ASIC board 32 for directly coupling the hard disk drive 50 to the ASIC board 32;

and the male gold finger 34 formed on the top and bottom surface of the PCB 31 and partially protruded form the PCB 31 is coupled to the ASIC board 32 for coupling to the cradle portion 10, wherein the male gold finger 34 further comprises standard 40 IDE signals or, SATA, SCSI, USB, Firewire or USIB signals so as to conventionally inserted into the slot 14 (Refer to FIG. 4). Therefore, the computer or equipment with IDE interface can access the SATA hard disk drive 50 by using the mass storage cradle device that comprises the bridge portion 30 of the present invention.

The ASIC board 32 further comprises an ASIC chip 321, a printed circuit board 322 and a socket 323, wherein, the ASIC chip 321 can be mounted on the top surface of the printed circuit board 322 and the socket 323 can be mounted on the bottom surface of the printed circuit board 322 so that the ASIC board 32 can be removably coupled to the printed circuit board 31 of the bridge portion 30 to execute translating according to different requirement.

Referring to FIG. 4, which illustrates the enlarge view of the cradle portion 10 in accordance with one embodiment of the present invention. As shown in Fig., the cradle portion 10 of the present invention further comprises: a PCB 13; a slot 14; a male IDE connector 15; and a fan 16.

Wherein, the PCB 13 can be fastened around the opening 11 by screws 17 for conveying the slot 14 and the female IDE connector 15, wherein, the PCB 13 can be partially exposed outward from the opening 11 for easily connecting the male IDE connector 15 to the IDE interface of the computer or equipment (not shown).

The slot 14 further comprises 40 IDE signals or SATA, SCSI, USB, Firewire or USIB signals corresponding to the male gold finger 34 that can be mounted on the PCB 13 for directly coupling to the male gold finger 34 of the bridge portion 30; the male IDE connector 15 is a standard 40-pin IDE connector, mounted on back surface of the PCB 13 for coupling to an IDE interface on the motherboard of a computer or the control board of a equipment (not shown); and the fan 16 can be positioned beside the PCB 13 and fastened by screws 17 for swapping the heat generated inside the enclosure portion 20 via the plurality of sector-shaped openings 12.

Figure 5:
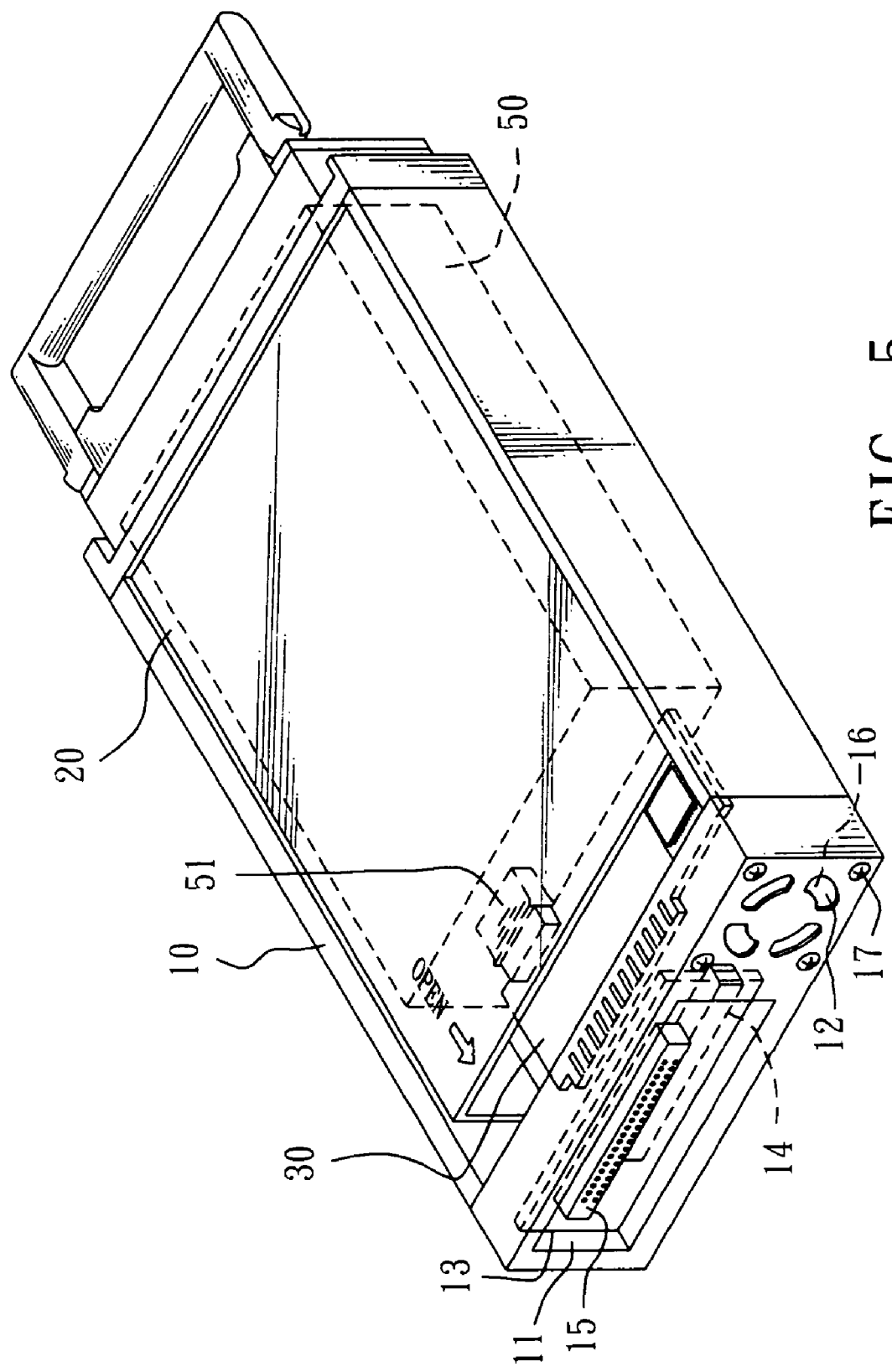
FIG. 5 illustrates an assembly appearance of the mass storage cradle device in accordance with one embodiment of the present invention.

Referring to FIG. 5, which illustrates an assembly appearance of the mass storage cradle device in accordance with one embodiment of the present invention. As shown in Fig., while assembling, the user can position the hard disk drive 50, such as a SATA type hard disk drive, into the hallow space 21 of the enclosure portion 20, then directly connect the SATA connector 51 of the hard disk drive 50 to the SATA connector 33 of the bridge portion 30, and then slide the enclosure portion 20 from outward to inward to near enough to the PCB 13 and directly plug the male gold finger 34 into the slot 14 of the cradle portion 10, finally, insert the cradle portion 10 into a drive bay of a computer and fix it by using a plurality of screws (not shown) and then connect the male IDE connector 15 to the IDE interface of the motherboard of the computer or control board of a equipment Thus, the computer or equipment with an IDE interface can access the SATA hard disk drive 50 by using the mass storage cradle device that comprises the bridge portion 30 of the present invention.

While the invention has been disclosed with reference to preferred embodiments thereof, it is to be understood that modifications or variations may be easily made without departing from the spirit of this invention, which is defined in the appended claims.

What is claimed is:

1. A mass storage cradle device that enables different types of storage devices to be conveniently added or removed from a computer or equipment without disassembling and reassembling the computer or equipment, which comprising:
    a cradle portion that can be secured to a drive bay of the computer or equipment;
    an enclosure portion that can slide in and out of said cradle portion, having a hollow space for containing said storage devices and providing connection of the electrical signals of said storage devices; and
    a bridge portion that can be positioned inside said enclosure portion and can translate a first interface into a second interface, and said first interface is different to said second interface in interface protocol,
    wherein said bridge portion is configured to be replaceable with another bridge portion of a different interface protocol.

2. The mass storage cradle device according to claim 1, wherein said cradle portion with outside dimension equal the inside dimension of said drive bay is mounted permanently inside a 5¼" drive bay.

3. The Mass storage cradle device according to claim 1, wherein said bridge portion further comprises:
    a PCB that can be positioned inside said enclosure portion for conveying the following elements;
    an ASIC board that can be removably mounted on said PCB for translating said first interface of said storage device and said second interface therebetween;
    a connector that can be mounted on said PCB and coupled to said ASIC board for coupling said storage device to said ASIC board; and
    a male gold finger that can be formed on top and bottom surface of said PCB and coupled to said ASIC board for coupling to said cradle portion.

4. The Mass storage cradle device according to claim 3, wherein said connector is a SATA, IDE, SCSI, USB, Firewire or USIB interface connector.

5. The Mass storage cradle device according to claim 3, wherein said male gold finger further comprises IDE, SATA, SCSI, USB, Firewire or USIB signals.

6. The mass storage cradle device according to claim 3, wherein said ASIC board further comprises an ASIC chip, a printed circuit board and a socket, wherein, said ASIC chip can be mounted on the top surface of said printed circuit board and said socket can be mounted on the bottom surface of said printed circuit board so that said ASIC board can be removably coupled to said printed circuit board of said bridge portion to execute translating according to different requirement.

7. The Mass storage cradle device according to claim 1, wherein said cradle portion further comprises an opening and a plurality of sector-shaped openings.

8. The Mass storage cradle device according to claim 7, wherein said cradle portion further comprises:
    a PCB that can be fastened around said opening by screws for conveying the following elements;
    a slot that can be mounted on said PCB for directly coupling to said male gold finger of said bridge portion;
    a male IDE connector that can be mounted on back surface of said PCB for coupling to an IDE interface on the motherboard of a computer or the control board of a equipment; and
    a fan, positioned beside said PCB for swapping the heat generated inside said enclosure portion via said plurality of sector-shaped openings.

9. The mass storage cradle device according to claim 7, wherein said slot further comprises IDE, SATA, SCSI, USB, Firewire or USIB signals corresponding to said male gold finger.

10. The mass storage cradle device according to claim 1, wherein said enclosure portion has outside dimensions equal the inside dimensions of said cradle portion.

11. The mass storage cradle device according to claim 1, wherein said first interface is a SATA, IDE, SCSI, USB, Firewire or USIB interface.

12. The mass storage cradle device according to claim 1, wherein said second interface is a SATA, IDE, SCSI, USB, Firewire or USIB interface.

* * * * *